United States Patent
Wicén

(10) Patent No.: US 6,467,825 B1
(45) Date of Patent: Oct. 22, 2002

(54) VACUUM EJECTOR WITH A NUMBER OF SUCTION CUPS

(75) Inventor: Jan Wicén, Arjeplog (SE)

(73) Assignee: Pronomic AB, Sollentuna (SE)

(*) Notice: Subject to any disclaimer, the term of this patent is extended or adjusted under 35 U.S.C. 154(b) by 0 days.

(21) Appl. No.: 09/622,015

(22) PCT Filed: Mar. 13, 1998

(86) PCT No.: PCT/SE98/00468
§ 371 (c)(1),
(2), (4) Date: Sep. 5, 2000

(87) PCT Pub. No.: WO99/46199
PCT Pub. Date: Sep. 16, 1999

(51) Int. Cl.[7] ............................................... B25J 15/06
(52) U.S. Cl. ........................................................ 294/64.3
(58) Field of Search ............................ 294/64.1, 64.2, 294/64.3; 269/21; 271/97, 98, 195; 406/88, 152, 153; 414/737, 752.1

(56) References Cited

U.S. PATENT DOCUMENTS

| | | | | |
|---|---|---|---|---|
| 3,361,469 A | * | 1/1968 | Yeager | 294/64.2 |
| 3,438,668 A | * | 4/1969 | Olsson et al. | 294/64.3 |
| 3,993,301 A | * | 11/1976 | Vits | 294/64.3 X |
| 4,118,058 A | * | 10/1978 | Rahn et al. | 294/64.3 |
| 4,474,397 A | * | 10/1984 | Hassan et al. | 294/64.3 |
| 4,773,687 A | * | 9/1988 | Bush et al. | 294/64.3 X |
| 4,921,520 A | * | 5/1990 | Carlomagno | 294/64.3 X |

FOREIGN PATENT DOCUMENTS

| | | | | |
|---|---|---|---|---|
| DE | 1531192 A | | 7/1969 | |
| EP | 0109080 A | | 5/1984 | |
| GB | 1036586 A | | 7/1966 | |
| RU | 1151497 | * | 4/1985 | 294/64.3 |

* cited by examiner

Primary Examiner—Johnny D. Cherry
(74) Attorney, Agent, or Firm—Frishauf, Holtz, Goodman & Chick, P.C.

(57) ABSTRACT

The invention relates to a vacuum ejector (1) is provided that includes a nozzle (4) for directing a jet of compressed air onto the center of a plate (5) which functions to deflect the compressed-air jet radially outwards at an angle of 90° in all directions, past a plurality of apertures (12) provided in the plate at a determined distance from the center (11) thereof. Each aperture (12) communicates with an associated suction cup (2) through the medium of a respective duct (14), for conducting the subpressure generated in the apertures (12) to respective suction cups (2).

7 Claims, 1 Drawing Sheet

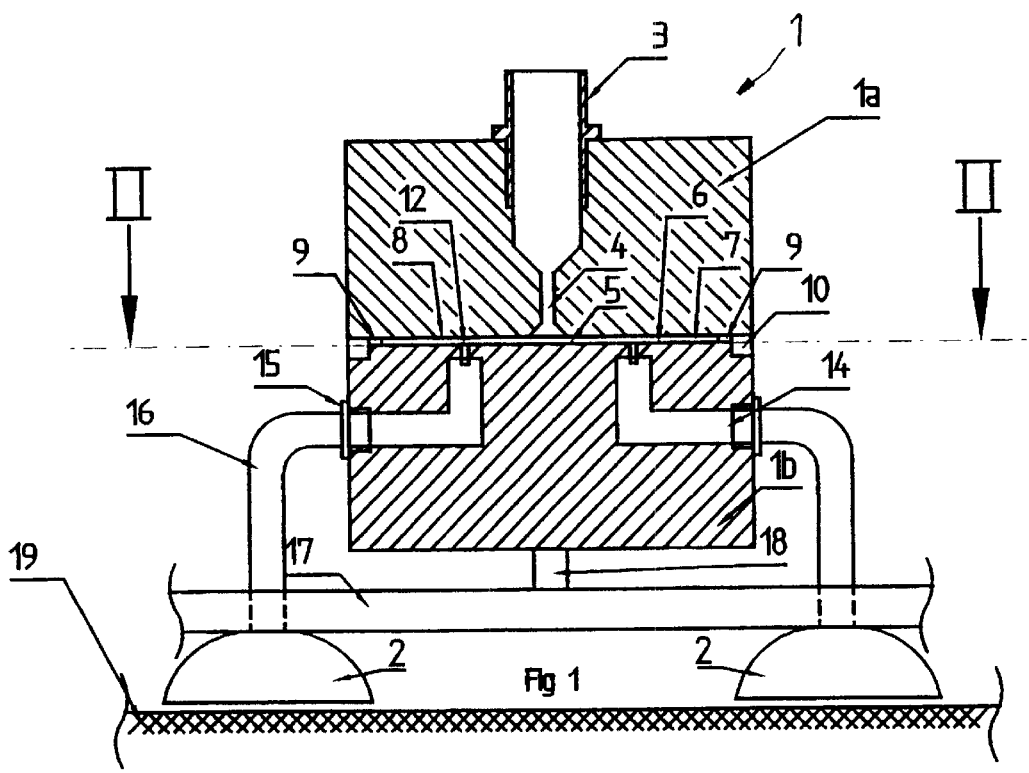
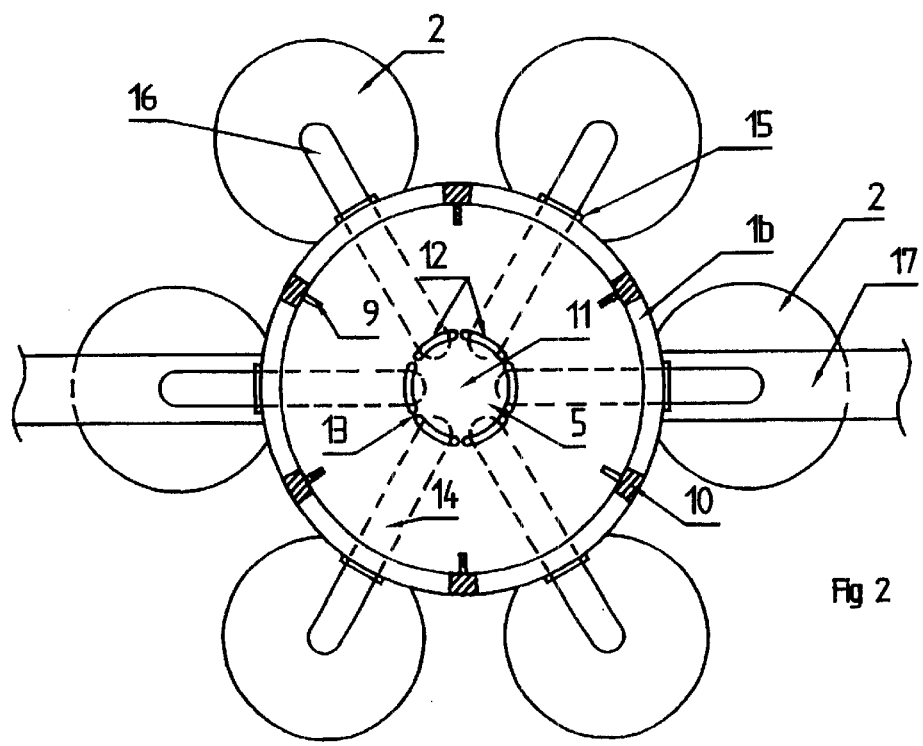
Fig 1
Fig 2

VACUUM EJECTOR WITH A NUMBER OF SUCTION CUPS

The present invention relates to a vacuum ejector that includes a nozzle which can be connected to a compressed air source for directing a jet of compressed air onto a circular plate located close to the nozzle orifice and essentially perpendicular to the center axis of said nozzle, said jet of air being deflected upon contact with the plate and expands radially outwards.

In a vacuum ejector of this kind the subpressure is taken out through an annular slot in the circular plate with its center in the extension of the center axis of the nozzle. The slot is connected to a vacuum chamber which can be connected to one or more suction cups for instance, by one or more conduits. When several suction cups are connected, there occurs the well known problem of balancing the flows in the conduits leading to the cups so as to avoid concentrating the major part of the flow on one or more suction cups that have not engaged a generally air-impermeable surface in the process of a lifting operation for instance. In such cases the remaining suction cups lose their ability to fasten to the surface, either totally or partially. This problem is normally alleviated by providing each suction cup with a valve which is normally closed. A valve operating means includes a pin which projects out in front of the plane of the suction cup and opens the valve when the suction cup is pressed against a surface. Alternatively, each suction conduit may be provided with a valve of the kind that is closed when the flow exceeds a predetermined limit. Both types of valves are expensive and one valve or a pair of valves is required for each suction cup, which adds greatly to the cost of an ejector device that includes many suction cups. Another drawback is that no standard valves are available for small suction cups, e.g. cups having a diameter of 10–15 mm. Each ejector will often include from three to ten suction cups of this small size.

OBJECT OF THE INVENTION

The object of the present invention is to provide a vacuum ejector that includes a plurality of suction devices with which the air flows are balanced-out in a simple and effective manner. This object is achieved in accordance with the invention by providing a plurality of apertures in the circular plate at a determined radial distance from the center of the circular plate centrally opposite the point of impact of the compressed-air jet, and connecting said apertures with separate ducts each of which is connected to its respective suction device.

Trials have shown that when using an inventive vacuum ejector equipped, e.g., with six suction cups each operating with 50 NI/min, the ejector will only lose about 3% units of vacuum level when both mutually adjacent suction cup ducts are exposed to atmosphere and about 0.75–1.0% unit of vacuum level when one or more non-adjacent suction cup ducts are exposed to atmosphere.

The best result is achieved when the apertures in the plate are in the form of arcuate slots that have the same radius of curvature as the radial distance to the center of the plate. According to one preferred embodiment, the slot interspaces are a fraction of the length of the slots. In order to reduce the pressure drop in the ducts leading to the suction devices, the areas of said ducts are preferably substantially greater than associated apertures in the circular plate.

BRIEF DESCRIPTION OF THE DRAWINGS

The invention will now be described in more detail with reference to an exemplifying embodiment of an inventive vacuum ejector and also with reference to the accompanying drawings, in which FIG. 1 is a longitudinal section view of the ejector, and FIG. 2 is a cross-sectional view taken on the line II—II in FIG. 1.

DETAILED DESCRIPTION

FIG. 1 shows the vacuum ejector 1 equipped with suction cups 2. The ejector 1 comprises an upper part 1a and a lower part 1b. The upper part 1a includes means 3 for connecting the ejector to a compressed-air source, and a nozzle 4 whose center axis is directed perpendicularly to a circular plate 5 which forms a part of an upper side 6 on the lower part 1b. A gap 7 is provided between the underside 8 of the upper part 1a and the upper side 6 of the lower part 1b. The gap 7 is fixed with the aid of radially extending ridges 9 on the lower part 1b and a guide flange 10 on the upper part 1a.

An extension of the center axis of the nozzle 4 meets a center point 11 on the plate or disc 5. As shown in FIG. 2, the plate 5 includes a plurality of arcuate apertures 12 at a given radial distance from the center point 11. Disposed between the apertures 12 are small interspaces 13 which lie in plane with the surface of said plate, these interspaces having a peripheral extension that is a fraction of the peripheral extension of the apertures 12.

Each aperture 12 communicates with an associated duct 14 which extends first axially and then radially outwards to a nipple 15 mounted on the outer surface of the lower part 1b. Connected to the nipple 15 is a hose 16 that leads to a suction cup 2 disposed on the underside of a plate 17. The plate 17 carries a bracket means 18 on which the ejector 1 is mounted.

When the suction cups 2 are placed against a smooth-surfaced object 19 to be lifted and compressed air is delivered to the connection 3, a jet of compressed air will be directed onto the center point 11 of the circular plate 5 and deflected radially outwards in all directions. As is known, this will result in a subpressure in the apertures 12 and therewith also in the individual ducts 14, hoses 16 and suction cups 2. No subpressure can be generated in any of the suction cups 2 that is positioned outside the surface of the object 19, with the result that air is only sucked in. By constructing the vacuum ejector in accordance with the invention, with an aperture 12 for each suction cup, the suction of air into the open suction cups is restricted and the subpressures in the remaining suction cups will be reduced by only about 3%-units.

This is a marked improvement on conventional vacuum ejectors with which all suction cups 2 are connected to a common vacuum chamber in the lower part of the ejector communicating with a circular groove in the plate 5. In the case of this known construction, the load will normally be released if one or more suction cups should happen to be located outside the confines of the object to be lifted, or if the one or more suction cups should happen to slip during the lift.

It will be understood that the invention is not restricted to the illustrated and described exemplifying embodiment, and that modifications can be made within the scope of the inventive concept defined in the claims. Thus, in the case of larger lifting devices, individually powered vacuum ejectors can be arranged to drive respective groups of suction cups. The inventive concept can also be applied to suction devices other than suction cups. For instance it can be applied in conjunction with a number of devices that are intended to suck liquid from a container in parallel. The suction ducts 14 may be disposed solely in an axial direction with the nipples 15 provided on the underside of the lower part 1b. The outflow of compressed air in the gap 7 can also be caused to take place axially up through the upper part 1a. It is also pointed out that the term "nozzle" as used herein means any form of device that can create a jet of compressed air. And finally, it is also pointed out that the apertures 12 in the circular plate 5 may be disposed at varying distances from the center point 11, so as to obtain different subpressures in the various suction devices.

What is claimed is:

1. A vacuum ejector comprising:

a nozzle which can be connected to a compressed-air source and which functions to direct a jet of compressed air;

a plate which is located close to an orifice of said nozzle and which is aligned approximately perpendicular to a center axis of said nozzle, said plate being arranged to deflect and expand the compressed-air jet radially outwards;

a plurality of apertures spaced at a predetermined radial distance from a center point of said plate at which the compressed-air jet strikes said plate;

a plurality of separate ducts which connect with the apertures and which are each connected to a respective suction device.

2. A vacuum ejector according to claim 1, wherein the apertures in the plate comprise arcuate slots having a same radius of curvature as the predetermined radial distance to the center point of said plate.

3. A vacuum ejector according to claim 2, wherein interspaces provided between said slots are less than a length of said slots.

4. A vacuum ejector according to claim 3, wherein the separate ducts have cross sectional areas that are substantially greater than cross-sectional areas of the apertures.

5. A vacuum ejector according to claim 2, wherein the separate ducts have cross sectional areas that are substantially greater than cross-sectional areas of the apertures.

6. A vacuum ejector according to claim 1, wherein the separate ducts have cross sectional areas that are substantially greater than cross-sectional areas of the apertures.

7. A vacuum ejector according to claim 1, wherein each suction device comprises a suction cup.

\* \* \* \* \*